June 14, 1960     C. P. LENT     2,940,703
RIBBON PARACHUTE AND AUTOMATIC RELEASE MEANS THEREFOR
Filed Aug. 4, 1954     3 Sheets—Sheet 1
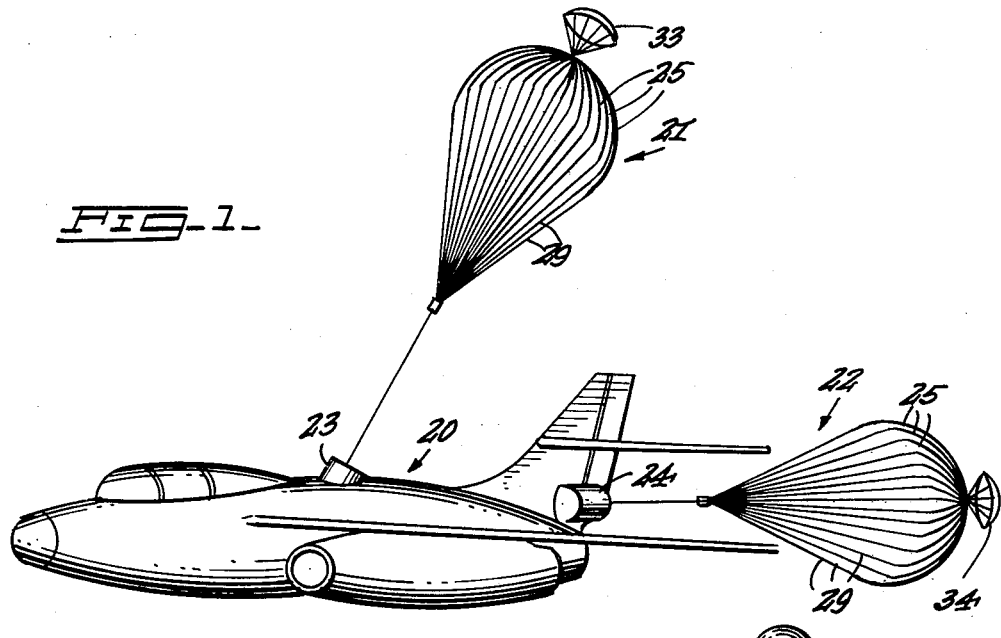
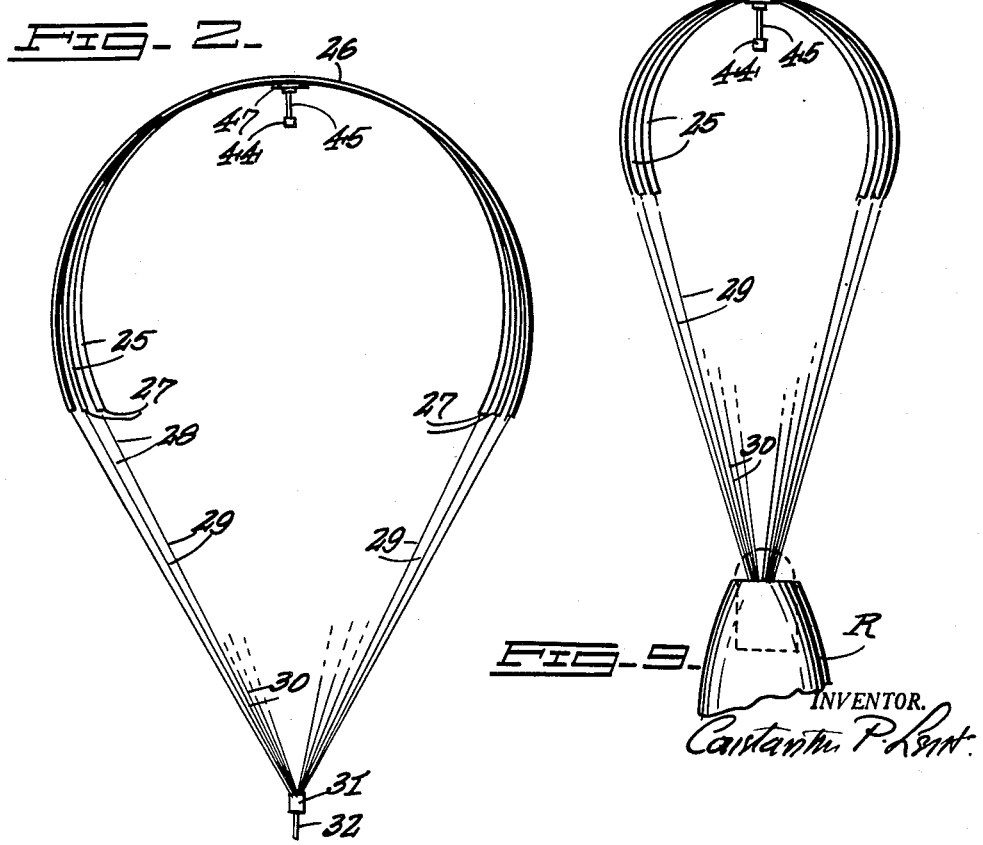
INVENTOR.
Constantin P. Lent June 14, 1960   C. P. LENT   2,940,703
RIBBON PARACHUTE AND AUTOMATIC RELEASE MEANS THEREFOR
Filed Aug. 4, 1954   3 Sheets-Sheet 2
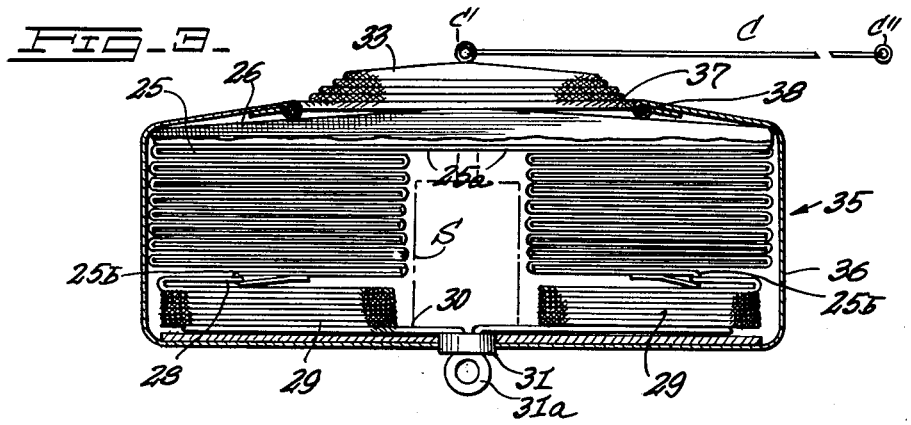
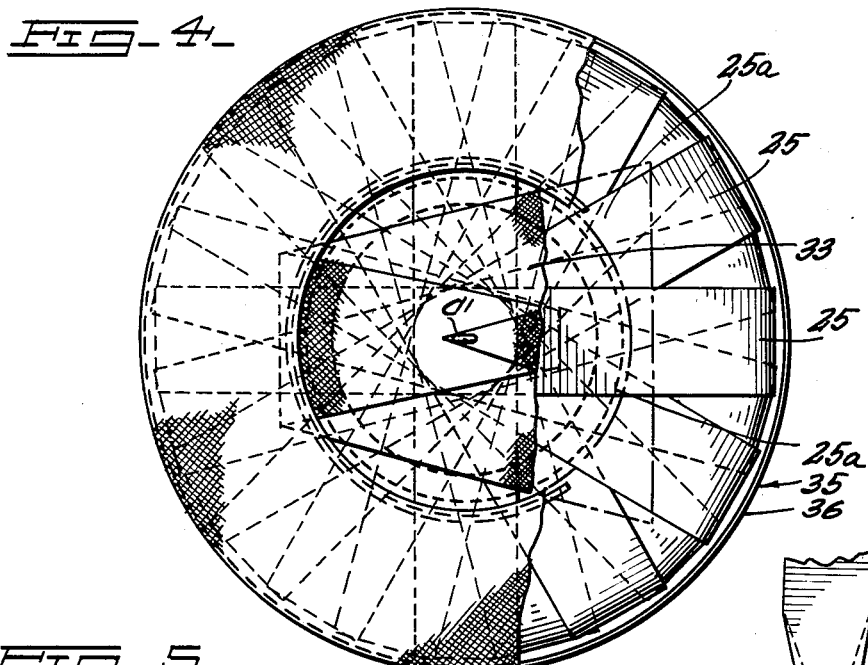
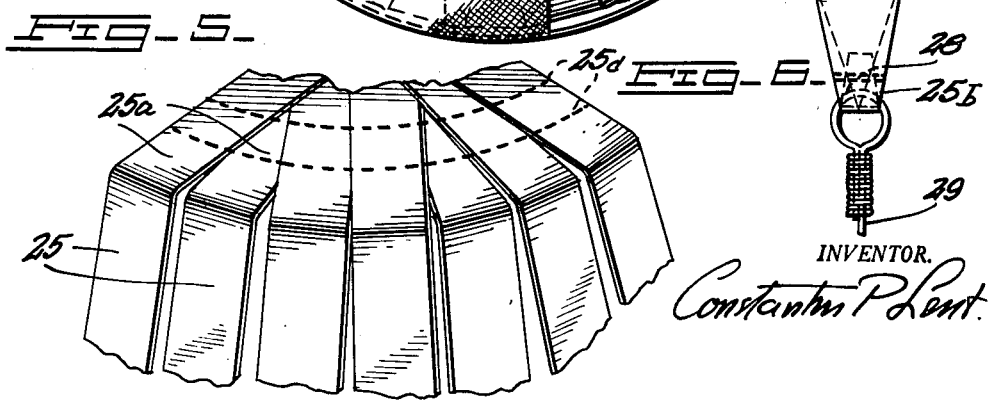
INVENTOR.
Constantin P. Lent

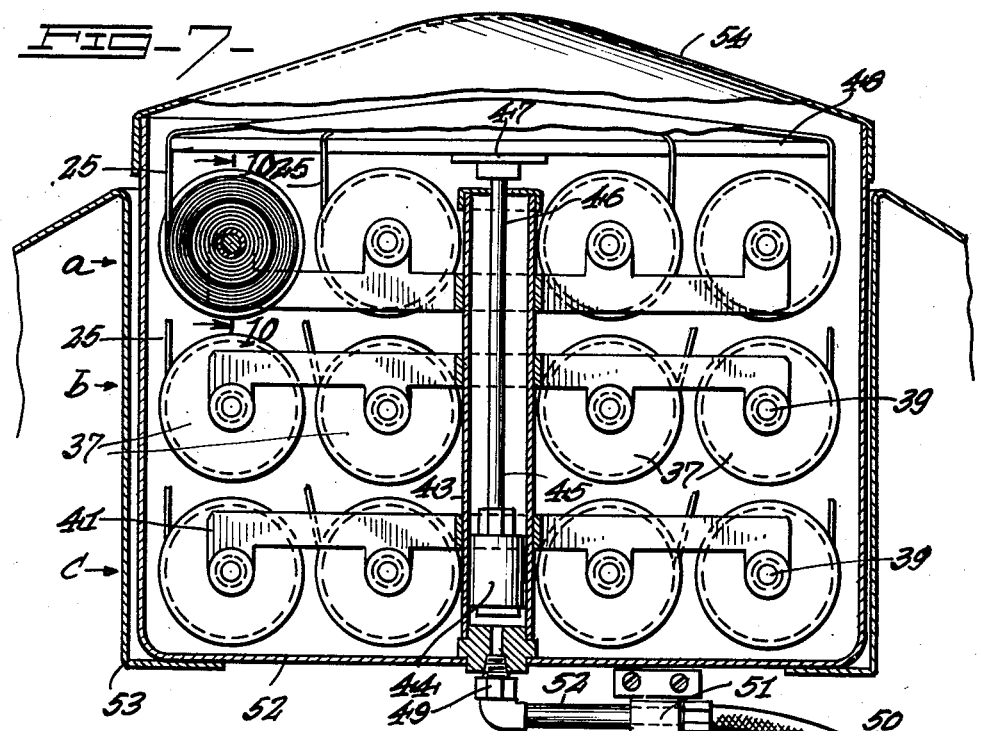
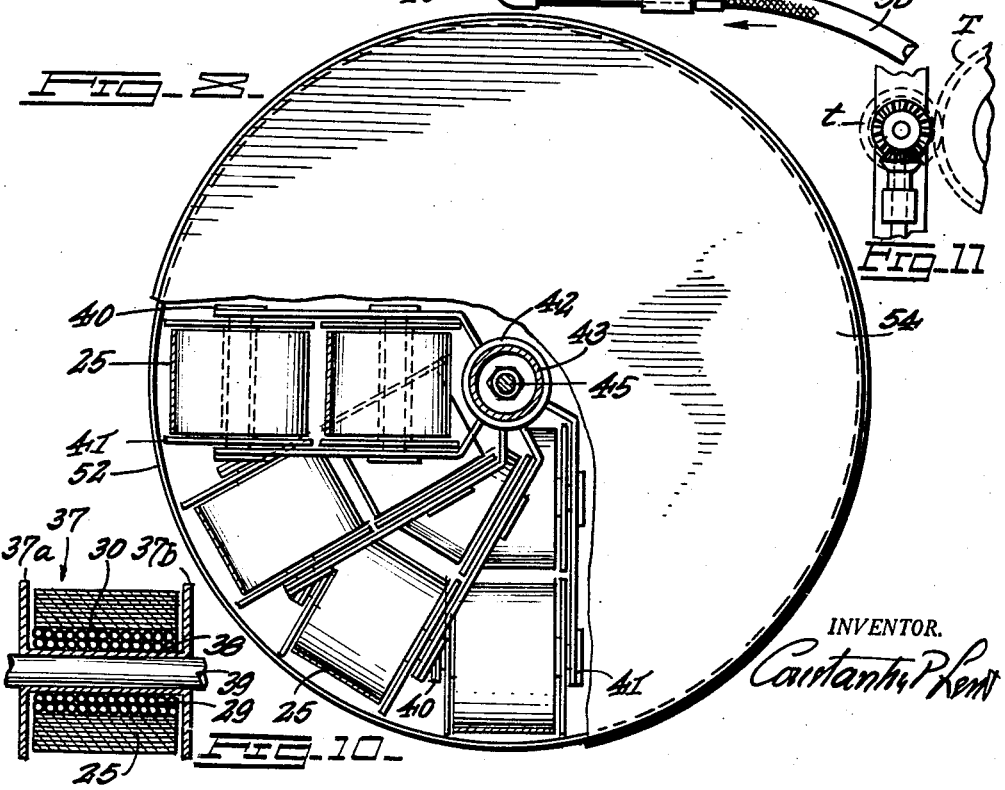

2,940,703
Patented June 14, 1960

United States Patent Office

2,940,703

RIBBON PARACHUTE AND AUTOMATIC RELEASE MEANS THEREFOR

Constantin Paul Lent, 156 W. 105th St., New York 25, N.Y.

Filed Aug. 4, 1954, Ser. No. 447,716

4 Claims. (Cl. 244—147)

This invention relates to parachutes and more particularly to parachutes made of strips or strands of cloth or silk ribbon. This invention also relates to means for ejecting or launching ribbon parachutes directly from the fuselage of an aeroplane, a rocket or a guided missile.

Heretofore, in parachutes made of ribbon strips, the ribbons in question were arranged around a center in circles or in a spiral. Between each consecutive ring of ribbon there was left a free space to permit the air under the parachute canopy to escape free while the parachute descends to the ground. In such parachutes each circular ribbon is secured to the next ring by means of cords running from the apex of the parachute canopy all way down to the last ribbon in the parachute.

The reason for ribbon parachutes is the need for permitting the air from under the canopy to escape to eliminate tilting of the parachute at descent. While the circular ribbon parachutes have accomplished this effect, their construction is too complex to permit the construction of cheap parachutes for commercial aviation. The circular ribbon parachutes are mainly used for war planes where the cost is not as important and safety comes first.

In addition, the folding of a ring ribbon parachute is a very difficult problem requiring skilled technicians. When such a parachute is damaged, it may not be repaired and used again. Commercial aviation would like to use landing parachutes to eliminate long runways, but the high cost of conventional parachutes is too high. There is a real demand for parachutes of low cost and of such nature that would permit reuse with the minimum of repair to the parachute canopy and refolding effort.

With is in mind, the advantages of the parachute of the present invention become more apparent. In the parachute in question the ribbon strips are not arranged in circular fashion, one after the other, but extend from a common center, radially forming a canopy. The ribbons in the parachute are not folded, as is the case with conventional ribbon parachutes, but each individual ribbon is wound around a roller. One end of the ribbon in the roller is secured to the canopy, and the other end is attached to the parachute strands or cords; the latter coming into a common point to which is attached the article or the load that the parachute must carry. In case of damage to one or more of the ribbons, the damaged portion is cut off and another length is sewn in, thus permitting the use of the parachute all over again. Instead of painstakingly folding the canopy of an entire parachute, each individual ribbon is rolled or folded separately. The entire folded or rolled parachute canopy is housed in a container or a capsule and may be secured in any convenient portion of an aeroplane's fuselage.

One object of this invention is to provide a ribbon parachute that is easy to manufacture and safe and inexpensive to operate.

A further object of this invention is to provide a ribbon parachute with individual ribbon strips wound upon separate ribbon spools.

Another object of this invention is to provide a ribbon parachute having a housing with individual spools in it upon which each individual ribbon of the parachute is wound.

A still additional object of this invention is to provide a ribbon parachute and means to fold each individual ribbon in the parachute to provide a compact parachute unit.

An additional object of this invention is to provide an air compression means to eject the parachute by remote control.

Another object of this invention is to provide a secondary parachute canopy to help pull the ribbon parachute out of its housing.

These and other objects will be seen as the description of the specification will proceed.

Referring to figures:

Fig. 1 shows the application of the ribbon parachute of the present invention in connection with the fuselage of a jet plane. One parachute being secured to the tail of the plane while another one to its fuselage.

Fig. 2 shows the parachute shown in Fig. 1, in expanded position.

Fig. 3 shows the parachute shown in Fig. 1 and how it appears packed in its housing.

Fig. 4 is a top view of the parachute shown in Fig. 3, partially cut away.

Fig. 5 is a perspective view showing the manner in which each individual ribbon of the parachute canopy is secured into the canopy.

Fig. 6 is a view showing the manner in which an individual ribbon is held fast to a parachute cord or rigging lines.

Fig. 7 is a modification showing the manner in which an individual ribbon is rolled upon a ribbon roller and the manner in which a plurality of ribbon rollers are housed in the parachute housing.

Fig. 8 is a top view of Fig. 7, partially broken away.

Fig. 9 is showing the application of the parachute shown in Figs. 1 to 8 inclusive for the purpose of lowering a rocket, a rocket missile or recording instruments.

Fig. 10 is a section taken on the line 10—10 of a ribbon roller shown in Fig. 7.

Fig. 11 shows the manner in which a roller may be operated by a roller winding mechanism to wind a ribbon into a roller.

Referring to Fig. 1, numeral 20 indicates the fuselage of a jet plane showing at least two parachutes 21 and 22 of the present invention in operation. The crash landing parachute 21 is housed, when not in use, in its housing 23, while the landing parachute 22 is housed in its tainer or housing 24. It can be seen that the parachute housing 23 is secured right over the fuselage of the plane, near the pilot's cabin, while the parachute housing 24 is conventionally secured in the rear of the plane, near its rudder. But any other portion of the plane's fuselage may be used for mounting the parachute housings. They even may be mounted on wings, in the nose of the plane etc.

The parachute canopy of each of the parachutes 21 and 22 is made of individual lengths of ribbons 25 which run from a central point or head 26 on either side of the parachute canopy. The ends 27 of each of the ribbons 25 are secured to one end 28 of the parachute cords or rigging lines 29, while the other ends 30, of the parachute cords 29 are held together within the member 31. A single, somewhat heavier length of cord 32 connects the parachute canopy to the parachute hook (not shown) inside the housings 23 or 24.

In the case of the parachutes shown in Fig. 1, they are being ejected or launched by means of smaller secondary parachutes 33 and 34 respectively. The parachutes 33 and 34 are first launched (by means of compressed air or in some other manner). As they trail in the stream of air created by the plane, they help pull the ribbon parachutes 21 and 22 out of their housings.

Referring to Figs. 3 to 6 inclusive, Fig. 3 shows the manner in which the ribbon parachutes shown in Fig. 1 are housed into their individual housings. Referring more particularly to Fig. 3, the ribbons 25 are folded lengthwise in a zig-zag formation. One end 25a is secured to the canopy 26, while the other end 25, is secured by means of the loop 25b to the parachute cord rigging lines 29, with one end 28 secured to the loop 25b and the other end 30 to the ring 31. The ring 31 has a hook portion or extension 31a to which the single cord 32 is attached.

The entire parachute, is housed within a bag 35 made of woven fabric which in the main consists of a cylindrical portion 36 which in its upper portion has an opening 37 made tight by means of a rubber ring 38. The entire parachute is housed in its bag in such a manner that when the secondary parachute 33 pulls on it, the ribbon parachute canopy clears the opening 37. As the parachute canopy passes through the opening 37 the individual ribbons unfold to form a continuous ribbon. The ribbons are followed by the cords which unfold in a similar manner, until the entire parachute canopy, ribbons and cords, extends beyond the fuselage forming the dome portion of the parachute canopy (see Fig. 5) of the plane to provide a brake effect in crash landing or to land a plane upon a short run-way.

The ends 25a of the parachute ribbon 25, are stitched to the canopy 26 by means of several rings of stitches 25d. Fig. 6 shows the manner in which each individual cord 29 is secured to the loop 28 of each individual ribbon.

Referring more particularly to Figs. 7, 8 and 10, Fig. 7 shows the manner in which the individual ribbons are wound upon individual rollers 37. The rollers 37 have flanges 37a and 37b connected across by the hollow connection 38 which is fitted over a stationary shaft 39. Each of the shafts 39 is mounted to a pair of frame brackets 40 and 41 respectively, both extending from a flange 42 that is mounted upon the cylinder 43. In the present case there are three rows of roller mountings a, b and c., each carrying a pair of rollers. But in larger parachutes with more ribbons, there may be many more additional rows of rollers.

The ribbon ends 27, wound in the rollers 37, are secured to the cords or rigging lines 29, in the like manner as shown in Fig. 6, while the opposite ends 30 of the cords 29, are made fast to the member 38. When each of the ribbons in the parachute canopy unwinds from the rollers it is wound on, the cords aforesaid will permit the ribbons to unwind to their entire length, before the cords themselves begin to unwind from the rollers.

Referring to the air cylinder 43, it has a piston 44 secured to a rod 45. The upper portion thereof 46 is held in a mounting 47 which is attached to a plate 48 upon which the entire parachute canopy is mounted. An air connection 49 leads to the cylinder 43, the air being piped by the flexible pipe connection 50. The connection 50 is held upon a bracket 51 fastened to the frame or the fuselage of a plane. Between the connection 49 and the bracket 51, there is a breakable fitting or pipe 52. The pipe 52 breaks off when the parachute housing 52 is detached off its receptacle 53 in the plane's fuselage. A cover 54 is located over the housing 52 containing the parachute canopy.

For the purpose of rewinding the ribbons into their individual rollers, the outer margin of the rollers may be provided with teeth T (see Fig. 11). The teeth T mesh with the teeth t of a spur gear belonging to a winding mechanism. The rotation of the gear t will rotate the roller and wind the ribbon back. The winding mechanism (not shown) is so arranged as to rotate all ribbon rollers in unison, winding the entire ribbon canopy back into its housing for further use. In this rewinding process, the cords or rigging lines are wound first followed by the ribbons later.

Having now described my invention what I claim is:

1. In a parachute means for launching a ribbon parachute including a plurality of straight ribbon strands, each strand comprising a length of ribbon, a plurality of rigging lines, each ribbon strand having two ends and each rigging line having two ends, a group of spool means and a frame means upon which said spools are mounted to rotate; one end of each ribbon strand being secured together in a common center to the ends of the other ribbon strands to form the dome of the parachute with the other ends said ribbon strands extending radially away from said center like a spoke in a wheel, to form the skirt of the parachute canopy; the other end of each ribbon being secured to one end of each of the rigging lines, the other end of the rigging lines being each fastened to one of the spool means in said group, each rigging line with its ribbon being wound upon a respective spool; and an ejector means housed under said dome portion of the parachute to eject and to deploy said parachute in the air stream, in so doing unwinding said ribbon strands and their respective rigging lines from said spool means upon which both are normally wound.

2. The same as claim 1; said ejector means having a cylinder and a plunger means, said ejector means being housed under the dome portion of said parachute, compressed air means connected to said cylinder to operate said plunger to eject said plunger off said cylinder to pull said ribbon canopy off the packaging means in which it is housed, the operation of said ejector means upon said canopy unwinding each individual rigging line and ribbon off their respective spool means upon which both are normally wound.

3. The same as claim 1; said parachute ejector means including a piston within a cylinder, said piston having a rod or plunger, said plunger contacting the under portion of the parachute canopy where all ribbons converge to a common center; piping means to supply compressed air to said cylinder to eject said plunger clear off said ejector means, the ejection of said plunger pulling out and unfolding each rigging line and its respective ribbon from the spool means upon which both are normally wound.

4. The same as claim 1; said frame upon which each spool means is mounted to rotate being housed in a packaging means or a container, said container being open at the top and having a cover, compressed air means to operate said parachute ejector means, said ejector means including a cylinder with a piston mounted in said packaging means under said cover, said cover being held to said parachute dome said piston contacting said dome from below, the operation of said piston in said cylinder raising said dome including said cover to open said container to eject and to deploy in the air stream the ribbon parachute means housed in said container.

References Cited in the file of this patent

UNITED STATES PATENTS

| | | |
|---|---|---|
| 1,069,662 | Adams | Aug. 12, 1913 |
| 1,776,629 | Kugler | Sept. 22, 1930 |
| 1,823,799 | Friedrich | Sept. 15, 1931 |
| 2,392,448 | Atherton | Jan. 8, 1946 |
| 2,500,170 | Fogal | Mar. 14, 1950 |
| 2,724,567 | Adams | Nov. 22, 1955 |
| 2,729,408 | Quilter | Jan. 3, 1956 |

FOREIGN PATENTS

| | | |
|---|---|---|
| 709,723 | France | May 20, 1931 |